United States Patent
Ohta (10) Patent No.: US 11,024,855 B2
(45) Date of Patent: Jun. 1, 2021

(54) ELECTRODE FOR USE IN A NONAQUEOUS ELECTROLYTE SECONDARY CELL, METHOD FOR PRODUCING SAME, AND NONAQUEOUS ELECTROLYTE SECONDARY CELL

(71) Applicant: NEC ENERGY DEVICES, LTD., Sagamihara (JP)

(72) Inventor: Tomoyuki Ohta, Kanagawa (JP)

(73) Assignee: Envision AESC Energy Devices Ltd., Sagamihara (JP)

(*) Notice: Subject to any disclaimer, the term of this patent is extended or adjusted under 35 U.S.C. 154(b) by 455 days.

(21) Appl. No.: 14/893,990

(22) PCT Filed: Jul. 1, 2014

(86) PCT No.: PCT/JP2014/067505
§ 371 (c)(1),
(2) Date: Nov. 25, 2015

(87) PCT Pub. No.: WO2015/002181
PCT Pub. Date: Jan. 8, 2015

(65) Prior Publication Data
US 2016/0111728 A1 Apr. 21, 2016

(30) Foreign Application Priority Data
Jul. 1, 2013 (JP) .............................. JP2013-138358

(51) Int. Cl.
*H01M 4/66* (2006.01)
*H01M 2/26* (2006.01)
(Continued)

(52) U.S. Cl.
CPC ........... *H01M 4/667* (2013.01); *H01M 2/263* (2013.01); *H01M 2/266* (2013.01);
(Continued)

(58) Field of Classification Search
CPC ........ H01M 2/26; H01M 2/263; H01M 2/266; H01M 4/667; H01M 4/131; H01M 4/0404;
(Continued)

(56) References Cited

U.S. PATENT DOCUMENTS

| 2011/0200884 | A1* | 8/2011 | Uchida | ................ H01M 4/139 429/245 |
| 2012/0196172 | A1* | 8/2012 | Maeda | ................ H01M 2/1673 429/139 |
| 2015/0194679 | A1 | 7/2015 | Ikeda | |

FOREIGN PATENT DOCUMENTS

| CN | 102623740 A | 8/2012 |
| JP | 11-162516 A | 6/1999 |

(Continued)

OTHER PUBLICATIONS

Machine Translation of JP 2008-108464 (cited on the IDS) (pub: May 2008).*

(Continued)

*Primary Examiner* — Eugenia Wang
(74) *Attorney, Agent, or Firm* — Sughrue Mion, PLLC (57) ABSTRACT

An electrode (1) for use in a nonaqueous electrolyte secondary cell includes: a current-collecting foil (10); an electrode mixture layer (2) that is formed on a portion of the current-collecting foil (10); and an oxide film (6) provided on the current-collecting foil (10) in at least a region that extends from the boundary (5) between a forming section (3) and a non-forming section (4) of the electrode mixture layer (2) and over a portion of the non-forming section (4).

5 Claims, 4 Drawing Sheets (51) Int. Cl.
*H01M 4/13* (2010.01)
*H01M 10/0525* (2010.01)
*H01M 4/131* (2010.01)
*H01M 4/04* (2006.01)
*H01M 4/1391* (2010.01)

(52) U.S. Cl.
CPC ....... *H01M 4/0404* (2013.01); *H01M 4/0471* (2013.01); *H01M 4/13* (2013.01); *H01M 4/131* (2013.01); *H01M 4/1391* (2013.01); *H01M 10/0525* (2013.01)

(58) Field of Classification Search
CPC .... H01M 4/1391; H01M 4/0471; H01M 4/13; H01M 10/0525; Y02E 60/10
See application file for complete search history.

(56) References Cited

FOREIGN PATENT DOCUMENTS

| JP | 2954147 | B1 | 9/1999 |
|---|---|---|---|
| JP | 2004-207117 | A | 7/2004 |
| JP | 2005-78963 | A | 3/2005 |
| JP | 2005-259682 | A | 9/2005 |
| JP | 2005-310402 | A | 11/2005 |
| JP | 2007-95423 | A | 4/2007 |
| JP | 3933573 | B2 | 6/2007 |
| JP | 2007-250376 | A | 9/2007 |
| JP | 2008-66050 | A | 3/2008 |
| JP | 2008-108464 | A | 5/2008 |
| JP | 2008-282799 | A | 11/2008 |
| JP | 2014-35958 | A | 2/2014 |

OTHER PUBLICATIONS

International Search Report for PCT/JP2014/067505 dated Sep. 9, 2014.
Communication dated Sep. 4, 2018 from the Japanese Patent Office in counterpart Application No. 2015-525229.
Communication dated Sep. 3, 2018 from the State Intellectual Property Office of the P.R.C. in counterpart Application No. 201480037447.4.

* cited by examiner

ELECTRODE FOR USE IN A NONAQUEOUS ELECTROLYTE SECONDARY CELL, METHOD FOR PRODUCING SAME, AND NONAQUEOUS ELECTROLYTE SECONDARY CELL

CROSS REFERENCE TO RELATED APPLICATIONS

This application is based upon and claims the benefit of priority from Japanese Patent Application No. 2013-138358 filed on Jul. 1, 2013, the content of which is incorporated by reference.

TECHNICAL FIELD

The present invention relates to an electrode for use in a nonaqueous electrolyte secondary cell, this electrode being used in a nonaqueous electrolyte secondary cell such as a lithium-ion secondary cell, a method for fabricating this electrode, and a nonaqueous electrolyte secondary cell.

BACKGROUND ART

A nonaqueous electrolyte secondary cell such as a lithium-ion secondary cell is composed of a positive electrode and negative electrode that are stacked with a separator interposed, or alternatively, stacked and coiled together. A nonaqueous electrolyte secondary cell normally maintains insulation between the positive electrode and negative electrode by having a separator interposed between both electrodes. However, if for some reason the separator should shrink, the position of the separator should shift, or the interior of the cell should become contaminated by extraneous matter, the possibility arises that a short circuit will occur due to contact between the electrodes at the ends of the electrodes, and in particular, at uncoated portions of the active material. An insulating layer is therefore formed on the end portions of one of the electrodes to prevent this defect.

Patent Document 1, for example, discloses a secondary cell that has an overcoat and that takes as its principal construction a positive electrode, a negative electrode, and a separator. Here, the positive electrode and negative electrode are realized by coating a metal foil with an active material and then the positive electrode and negative electrode are stacked with a separator interposed between them. The overcoat is a covering provided on at least a portion of the surface on which the active material is not applied on the positive electrode. The overcoat, by electrically and thermally separating the covered portion from the separator, prevents melting of the separator due to overheat of the electrodes. As preferable materials for the overcoat, polyimide (registered trademark: Kapton) and resin materials such as polyphenylene sulfide resin (PPS) and polypropylene (PP) are known materials.

In order to form an insulating layer on the end portion of the electrode, insulation tape may also be used in addition to an overcoat.

LITERATURE OF THE PRIOR ART

Patent Documents

Patent Document 1: Japanese Patent No. 2954147

SUMMARY OF THE INVENTION

Problem to be Solved by the Invention

An insulating layer is formed on the end portion of an electrode to prevent short circuits that occur inside a cell such as described above. However, an insulating layer that is formed with the object of preventing short circuits is normally realized by an overcoat or by insulating tape, resulting in an increase in the thickness of the electrode in the portion in which the insulating layer is provided. As a result, the insulating layer has an effect on the outer appearance of the battery cell, but the effect of the insulating layer does not end with the outer appearance, but may also bring about a decrease of volumetric efficiency when a plurality of battery cells are used to assemble a battery pack. In addition, this type of battery has stronger pressure in the portion of the electrode where thickness is increased but weaker pressure in portions that do not bulge out. The flow of current inside the battery is therefore not uniform and the consequent occurrence of overvoltage may accelerate deterioration of the structural parts of the battery and reduce battery life.

It is therefore an object of the present invention to provide an electrode for use in a nonaqueous electrolyte secondary cell that can reduce the concern regarding the occurrence of internal short circuits and that can make the thickness of the nonaqueous electrolyte secondary cell uniform.

Means for Solving the Problem

The electrode for use in a nonaqueous electrolyte secondary cell according to the present invention includes: a current-collecting foil; an electrode mixture layer that is formed on a portion of the current-collecting foil; and an oxide film that is provided on the current-collecting foil in at least a region that extends from the boundary between the forming section and non-forming section of the electrode mixture layer and over a portion of the non-forming section.

The method of fabricating the nonaqueous electrolyte secondary cell according to the present invention includes: a first step of applying, on a current-collecting foil that has greater length in a first direction than length in a second direction that is orthogonal to the first direction, an electrode mixture layer in the form of stripes that are parallel to the first direction, and then providing an oxide film on the current-collecting foil in at least a region that extends from the boundary between the forming section and the non-forming section of the electrode mixture layer and over a portion of the non-forming section; a second step of, after the first step, coiling the current-collecting foil around an axis that is parallel to the second direction to form an electrode roll, and a third step of cutting off an electrode in a desired size from the electrode roll.

The nonaqueous electrolyte secondary cell according to the present invention includes a cell element realized by stacking a positive electrode and a negative electrode with a separator interposed, and a laminate sheathing that accommodates and seals the cell element. At least one of the positive electrode and negative electrode is the electrode for use in a nonaqueous electrolyte secondary cell of the present invention described hereinabove. The oxide film that is provided on the non-forming section of the electrode mixture layer partially overlies at least the end region of the separator when viewed from the stacking direction of the positive electrode and negative electrode.

Effect of the Invention

The present invention can reduce the concern for the occurrence of internal short circuits and can make the thickness of a nonaqueous electrolyte secondary cell uniform.

BEST MODE FOR CARRYING OUT THE INVENTION

Exemplary embodiments of the present invention are next described with reference to the accompanying drawings.

Figure 1A:
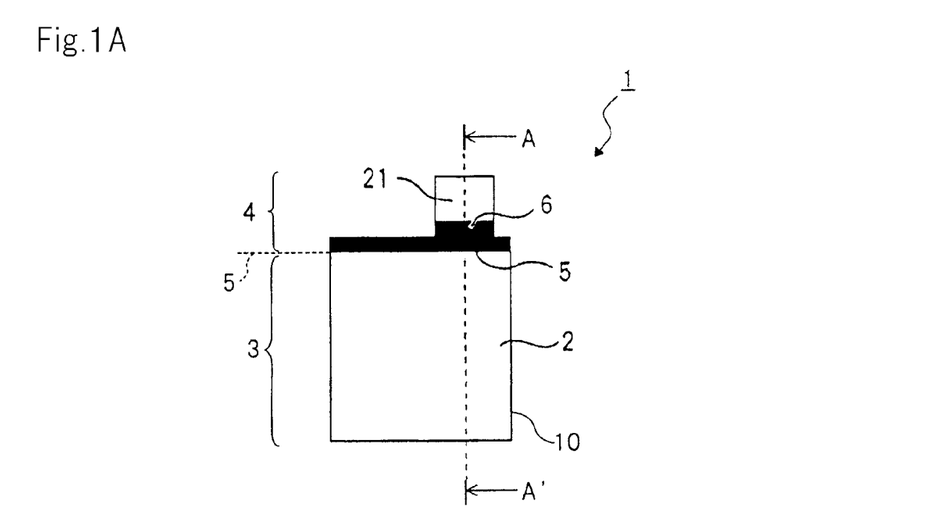
FIG. 1A is a view for describing an example of the electrode for use in a nonaqueous electrolyte secondary cell in an exemplary embodiment of the present invention.
Figure 1B:
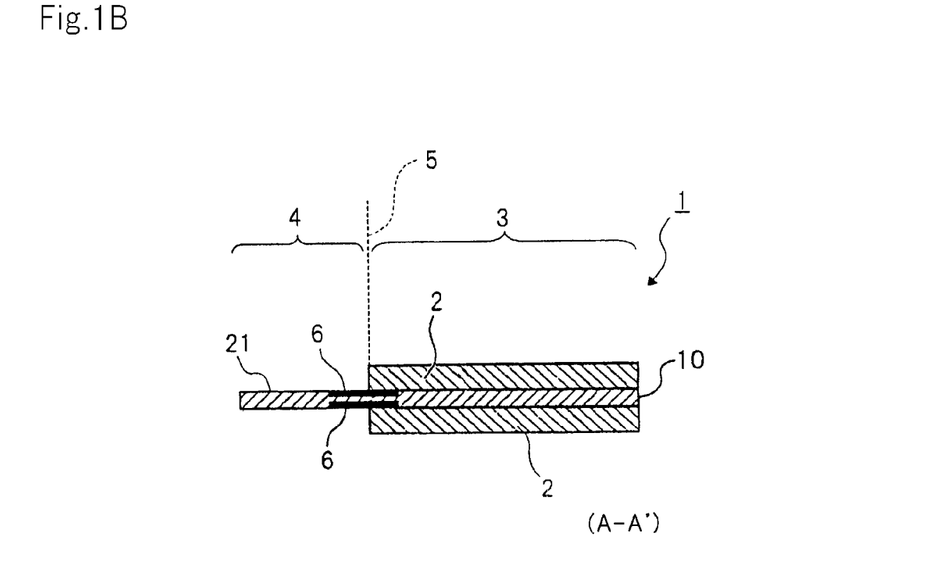
FIG. 1B is a sectional view for describing an example of the electrode for use in a nonaqueous electrolyte secondary cell in an exemplary embodiment of the present invention.
Figure 2A:
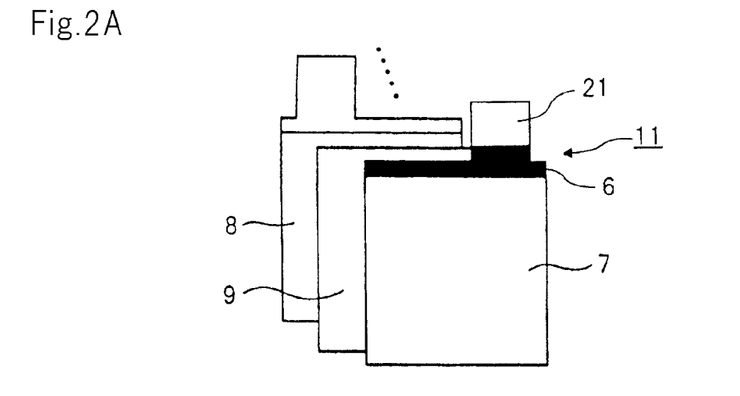
FIG. 2A shows a lithium-ion secondary cell having a stacked construction in an exemplary embodiment of the present invention.
Figure 2B:
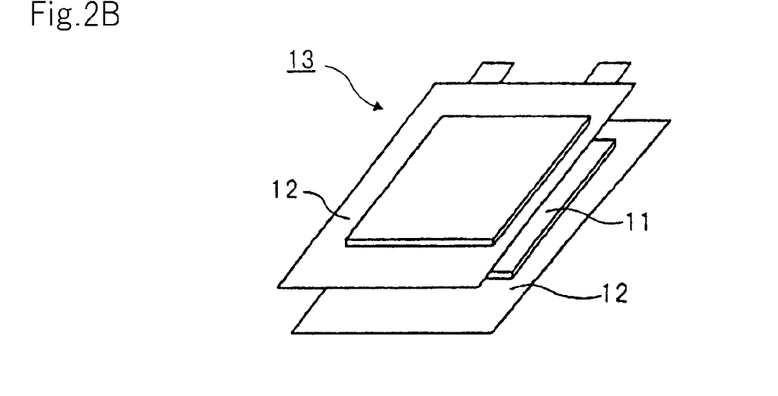
FIG. 2B shows a lithium-ion secondary cell having a stacked construction in an exemplary embodiment of the present invention.
Figure 2C:
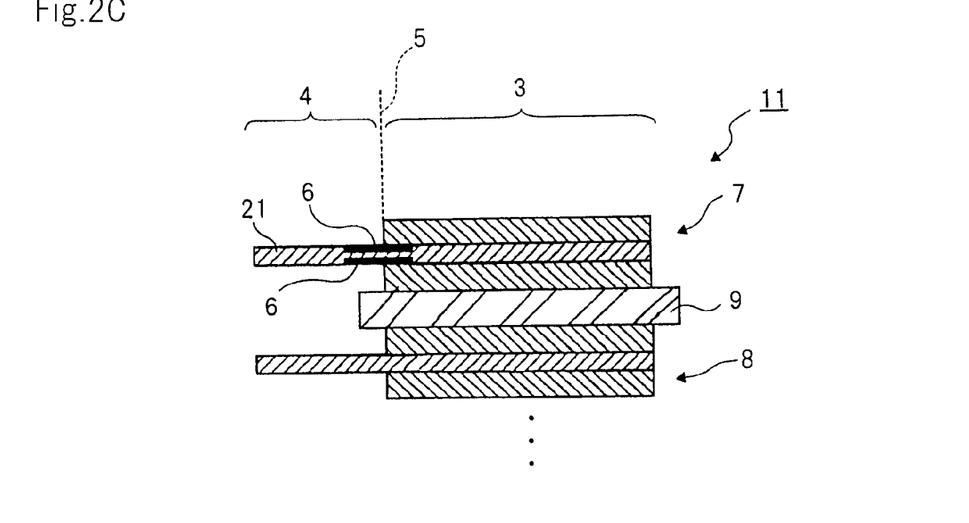
FIG. 2C is a sectional view showing a lithium-ion secondary cell having a stacked construction in an exemplary embodiment of the present invention.
Figure 3:
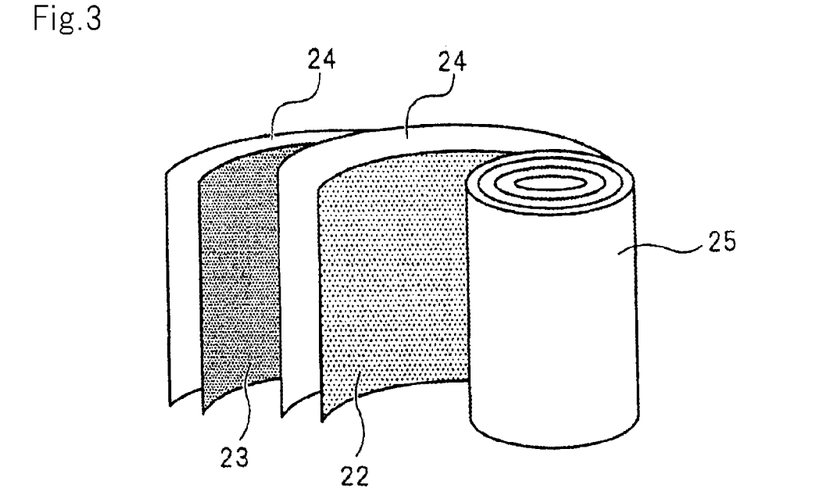
FIG. 3 shows a lithium-ion secondary cell of coiled construction in the first exemplary embodiment.

FIG. 1 is a view for describing an example of electrode 1 for use in a nonaqueous electrolyte secondary cell in an exemplary embodiment of the present invention. A plan view is shown in FIG. 1A, and a sectional view taken along line A-A' in FIG. 1A is shown in FIG. 1B. FIGS. 2A and 2B show a lithium-ion secondary cell of stacked construction in an exemplary embodiment of the present invention. FIG. 2C is a sectional view of the lithium-ion secondary cell of stacked construction in an exemplary embodiment of the present invention. FIG. 3 shows a lithium-ion secondary cell of coiled construction in the first exemplary embodiment.

In the present exemplary embodiment, a lithium-ion secondary cell is described as an example of a nonaqueous electrolyte secondary cell. As shown in FIG. 2A, cell element 11 is formed by stacking positive electrode 7 and negative electrode 8 with separator 9 interposed. As shown in FIG. 2B, cell element 11 is accommodated in aluminum laminate sheathing 12 to fabricate lithium-ion secondary cell 13. Nonaqueous electrolyte is injected inside the cell. Apart from above-described cell element 11, cell element 25 in which positive electrode 22 and negative electrode 23 are stacked with separator 24 interposed and then coiled in spiral form as shown in FIG. 3, or a cell element in which a coiled body in spiral form is formed in a flat shape, may be used as cell element 11 of a lithium-ion secondary cell.

The following explanation chiefly relates to lithium-ion secondary cell 13 of a stacked construction, but the present invention is not limited to this form.

The electrodes of the present exemplary embodiment are formed from current-collecting foil 10, electrode mixture layer 2 that is applied to current-collecting foil 10, and tab 21.

Current-collecting foil 10 is a metal foil referred to as a collector. An aluminum foil is chiefly used as positive electrode 7. A copper foil is chiefly used as negative electrode 9.

As will be described hereinbelow, electrode mixture layer 2 is a mixture that contains active material. The active material is a material that facilitates an oxidation/reduction reaction in which electrons are given off and received, and the active material plays a central role in the cell reaction. A lithium transition metal oxide such as lithium cobalt oxide is used for the positive electrode, and carbon is used for the negative electrode.

Tab 21 is a connection terminal for the input and output of electric power. The tab is in some cases fused to one end of current-collecting foil 10, and in other cases one end of current-collecting foil 10 is extended to function as a tab.

As the nonaqueous electrolyte, a mixture of, for example, a lithium salt such as lithium hexafluorophosphate in an organic solvent such as ethylene carbonate or diethyl carbonate is used.

Separator 9 serves to maintain insulation between positive electrode 7 and negative electrode 8. Separator 9 in some cases has a characteristic referred to as a "shutdown characteristic." The shutdown characteristic is the fuse function of separator 9. In other words, during an abnormality in which, for example, a short circuit occurs, a large short-circuit current flows between positive electrode 7 and negative electrode 8 and the temperature inside the cell rises, separator 9 softens and melts to block the holes of separator 9, whereby the permeability of ions decreases, and with this decrease in the permeability of ions, the short-circuit current also decreases. The internal temperature of the cell can thus be prevented from rising above a fixed temperature and safety is maintained.

A film of a polyolefin such as polypropylene or polyethylene is typically used as separator 9.

Electrode mixture layer 2 described hereinabove is realized by mixing together active material, a dispersing agent, a leveling agent, a conductivity aid, and a binder. The dispersing agent is for dispersing and preventing clumping of the active material. The leveling agent causes the electrode mixture layer 2 to make better contact with the electrolyte and maintains wettability. The conductivity aid is for raising the conductivity of the electrode mixture layer. The binder binds the solid particles together. The leveling agent and the conductivity aid are in some cases not mixed with the binder.

Electrode 1 for use in a nonaqueous electrolyte secondary cell of the present exemplary embodiment has current-collecting foil 10 and electrode mixture layer 2 that is formed on a portion of current-collecting foil 10. The area on current-collecting foil 10 is composed of forming section 3 in which electrode mixture layer 2 is formed and non-forming section 4 in which electrode mixture layer 2 is not formed. Oxide film 6 is provided at least on a region that extends from boundary 5 between forming section 3 and non-forming section 4 and over a portion of non-forming section 4.

Regarding oxide film 6 in electrode 1 for use in a nonaqueous electrolyte secondary cell of the present exemplary embodiment, if oxide film 6 is formed on both surfaces of one electrode of the positive electrode and negative electrode, oxide film 6 may be formed or not formed on the other electrode. When oxide film is formed on only one surface of both the positive electrode and negative electrode, oxide film 6 is provided on the same surface side of both electrodes. This is to prevent surfaces that lack oxide film 6 of both electrodes from facing each other when the positive electrode and negative electrode are stacked.

First Exemplary Embodiment

As shown in FIG. 1A, connection terminal (tab 21) for the input and output of electric power is formed by extending current-collecting foil 10 on one end of current-collecting foil 10. Electrode mixture layer 2 is formed on current-collecting foil 10 from the end that is on the opposite side (the A' side of broken line A-A') of the end (the A-side of broken line A-A') on which tab 21 is formed of electrode 1 for use in a nonaqueous electrolyte secondary cell. Electrode mixture layer 2 extends from the other side of current-collecting foil 10 as far as boundary 5 but does not extend as far as the region of tab 21. On the other hand, oxide film 6 extends from the region that includes boundary 5 as far as a portion of the region of tab 21.

Oxide film 6 in the first exemplary embodiment is formed by oxidizing only a portion that is adjacent to boundary 5 as shown in FIG. 1A, but may also be formed by oxidizing all of non-forming section 4.

A forming method by means of heating is used as the method of forming oxide film 6, and examples of the heating method that can be offered include heating (IH heating) that uses IH (Induction Heating), heating that uses a heater, and heating using a laser. In addition, methods of forming oxide film 6 further include a method in which a chemical process, such as boehmite treatment, is applied. The method of forming oxide film 6 is not limited to these forms.

Oxide film 6 may be formed to a thickness sufficient to make the conductivity lower than the portion in which oxide film 6 is not formed.

When fabricating a stacked lithium-ion secondary cell, oxide film 6 is formed on current-collecting foil 10 by using a heater to heat the non-forming section of the positive electrode as shown in FIG. 1. Oxide film 6 is formed by increasing the temperature to the point where the color of the surface of current-collecting foil 10 changes. In addition, because oxide film 6 is formed by heating, the heat is also conducted to the portion below the region (forming section 3) on which electrode mixture layer 2 was applied. As a result, oxide film is formed on a portion of forming section 3 similar to non-forming section 4, as shown in FIG. 1B.

FIG. 2A shows cell element 11 that is formed by using positive electrode 7 shown in FIG. 1 and stacking positive electrode 7 and negative electrode 8 with separator 9 interposed. FIG. 2B shows lithium-ion secondary cell 13 that is fabricated by accommodating cell element 11 in aluminum laminate sheathing 12. In lithium-ion secondary cell 13 that is obtained in this way, the portion having insulation is only oxide film 6, and the thickness of positive electrode 7 therefore hardly undergoes any change. As a result, lithium-ion secondary cell 13 is obtained in which the outer appearance of the portion corresponding to cell element 11 is even and smooth, as shown in FIG. 2B. As a result, the thickness of a battery cell realized by stacking a plurality of lithium-ion secondary cells 13 can be made uniform, thereby enabling an improvement in the performance of the battery cell, an improvement in safety, and an improvement of the volumetric efficiency (volume energy density of the battery pack).

This effect is particularly salient in the laminate sheathing (a sheathing formed by a metallic laminate sheet in which a metal layer and a resin layer are laminated). However, the present invention is not limited to a laminate sheathing, and a film sheathing composed of a resin may also be used.

In addition, oxide film 6 that is provided on non-forming section 4 at least partially overlaps with the end region of separator 9 when viewed from the stacking direction of the electrodes. In other words, oxide film 6 is formed on non-forming section 4 of positive electrode 7 so as to partially overlie the end portion of separator 9 in a section that is parallel to the stacking direction of the electrodes, as shown in FIG. 2C. By providing oxide film 6 on non-forming section 4, oxide film 6 functions as a protective film of the insulation. As a result, in the unlikely event of shrinkage or shifting of separator 9 and contamination by extraneous matter in the cell interior, heat, smoke, and fire resulting from the short circuit can be prevented. This effect can be obtained because, even should separator 9 that functions as an insulating film shrink or shift in position, oxide film 6 that at least partially overlaps with the end region of separator 9 still functions as an insulating film.

Safety tests were carried out using lithium-ion battery cell 13 described above. An overcharging test was carried out as an item of the safety tests. In the present exemplary embodiment, the thickness of the electrodes is uniform and cell element 11 is stacked uniformly, whereby heat transfer at the time of overcharging was also uniform. As the result of the overcharging test of the present exemplary embodiment, the shutdown of separator 9 also proceeded uniformly, current was limited, and the test was completed without rupture or burning of battery cell 13.

Cell element 11 described above was formed by stacking positive electrode 7 and negative electrode 8 with separator 9 interposed, but no limitations were placed on the construction of cell element 11. As shown in FIG. 3, effects equivalent to those described above can be obtained even when the lithium-ion secondary cell is fabricated using cell element 25 realized by stacking positive electrode 22 and negative electrode 23 with separator 24 interposed and then coiling this assembly in spiral form.

Second Exemplary Embodiment

A battery pack was assembled using ten lithium-ion battery cells 13 of the first exemplary embodiment. The battery pack was constructed by stacking and arranging ten battery cells 13. Because the surfaces of each of battery cells 13 are flat and smooth in the second exemplary embodiment, battery cells 13 could be stacked without gaps. An appraisal was carried out regarding the life of a cell pack of the second exemplary embodiment that is configured in this way. In the second exemplary embodiment, the surface of each of battery cells 13 is smooth and flat, and each battery cell 13 is subjected to uniform pressure, and the cell pack therefore exhibited superior life performance.

First Comparative Embodiment

Figure 4A:
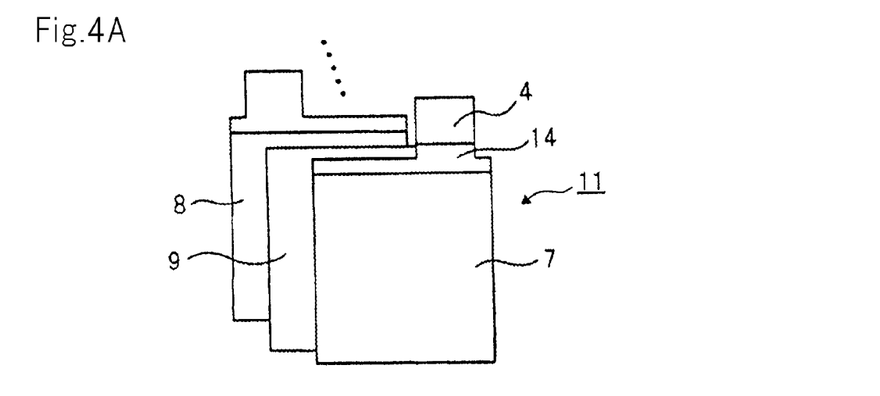
FIG. 4A shows a lithium-ion secondary cell of stacked construction in the first comparative embodiment.
Figure 4B:
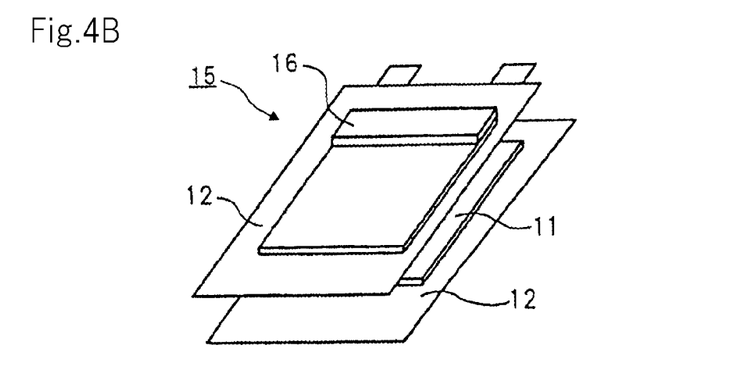
FIG. 4B shows a lithium-ion secondary cell of stacked construction in the first comparative embodiment.

FIGS. 4A and 4B show a lithium-ion secondary cell of stacked construction in the first comparative embodiment. In fabricating the stacked lithium-ion secondary cell, insulation tape 14 was adhered to non-forming section 4 of positive electrode 7, as shown in FIG. 4B. Insulation tape 14 was used that was formed with polypropylene as the chief component. Regarding insulation tape 14, two layers of insulation tape 14 were adhered to one positive electrode, one layer being adhered to each of the obverse and reverse of the positive electrode. Lithium-ion secondary cell 15 was fabricated under the same conditions as in the first exemplary embodiment except for the use of above-mentioned positive electrode. In a cell obtained in this way, the insulating layers are made up from insulation tape 14, and even though each separate insulation tape 14 is thin, insulation tape 14 is stacked to a thicknesses that is twice the number of stacked layers of the positive electrodes. As a result, bulge 16 is produced in the portion in which insulation tape 14 was adhered as shown in FIG. 4B, and lithium-ion secondary cell 15 is thus constructed in which this bulge 16 is conspicuous when viewed from outside the surface of lithium-ion secondary cell 15.

A safety test was carried out using the above-described lithium-ion battery cell 15. An overcharging test was carried out as one item of the safety test. In the first comparative embodiment, the thickness of the electrode is uneven, and the cell elements are therefore unevenly stacked, whereby heat was not uniformly transferred during overcharging. As a result of the overcharging test in the first comparative embodiment, even when one portion of separator 9 in the cell shut down, the other portions of separator 9 did not shut down and current therefore continued to flow. As a result, the first comparative embodiment caught fire.

Second Comparative Embodiment

In the second comparative embodiment, a battery pack was assembled using ten lithium-ion battery cells 15 of the first comparative embodiment. The battery pack was assembled by stacking and arranging ten battery cells 15. In the second comparative embodiment, the portion of the surface of each battery cell 15 in which insulation tape 14 was applied bulged, and as a result, gaps occurred between battery cells 15 when battery cells 15 were stacked, and the thickness of the entire battery pack increased. An appraisal of the life of the battery pack of the second comparative embodiment that was constructed in this way was then carried out. As a result of the life appraisal, the life of the battery pack of the second comparative embodiment decreased compared to that of the second exemplary embodiment. In the second comparative embodiment, the portion of battery cells 15 in which insulation tape was applied bulged out, and pressure in the bulging portions was therefore strong and pressure in the portions that did not bulge was weak. As a result, it is believed that deterioration of the constituent parts of battery cell 15 was accelerated in the second comparative embodiment due to the effect of, for example, the occurrence of overvoltage resulting from the uneven flow of the internal current of the cell.

Third Exemplary Embodiment

Figure 5:
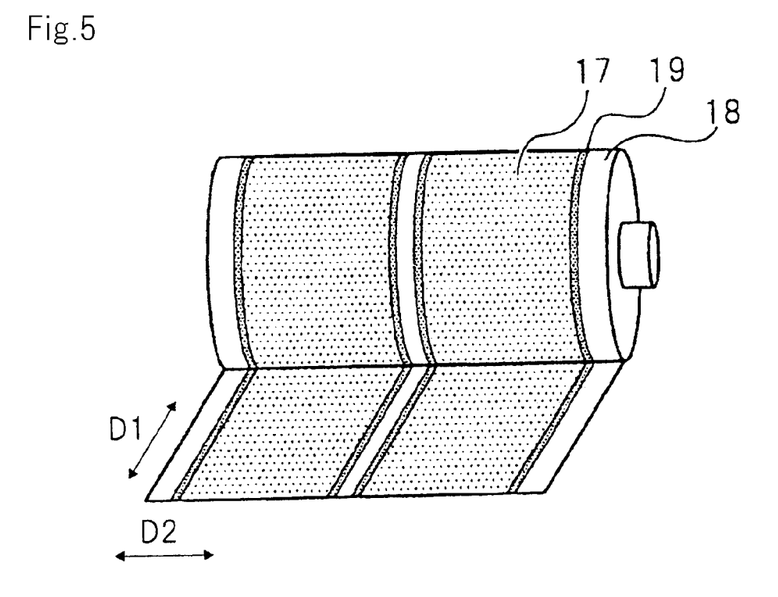
FIG. 5 is a perspective view showing an electrode roll for use in a lithium-ion secondary cell in the third exemplary embodiment.

FIG. 5 shows a perspective view of a lithium-ion secondary cell in the third exemplary embodiment. In the third exemplary embodiment, in the fabrication steps of a positive electrode for use in a lithium-ion secondary cell, electrode mixture layer 2 is applied in the form of parallel stripes (stripe application) in a first direction D1 on a band-shaped current-collecting foil concerning which the length in the first direction D1 is much longer than the length in a second direction D2 that is orthogonal to the first direction D1, as shown in FIG. 5. After the stripe application, oxide film 19 was formed by performing IH heating in the vicinity of the boundary portion between forming section 17 and non-forming section 18. At this time, oxide film 19 is formed in a region that extends at least from the boundary between forming section 17 and non-forming section 18 to a portion of non-forming section 18. Oxide film 19 was formed by heating to the point at which the aluminum foil changed color.

An electrode roll such as shown in FIG. 5 was formed by coiling the current-collecting foil that has been processed in this way around an axis that is parallel to the second direction. Despite the formation of oxide film 19, the thickness of the electrode is virtually unchanged, and as a result, the roll shape of an electrode roll is virtually unaffected even when a long current-collecting foil having a length of 4000 m or more was used in carrying out the coiling operation, and the electrode roll can therefore be efficiently manufactured. The third exemplary embodiment enables the prevention of bulging in portions of the electrode roll when coiling the current-collecting foil, the third exemplary embodiment allows a longer electrode roll, and the third exemplary embodiment enables an improvement in productivity.

The electrode for use in a lithium-ion secondary cell such as shown in FIG. 1 is obtained by cutting electrodes to a size that corresponds to the desired lithium-ion secondary cell from an electrode roll such as shown in FIG. 5.

Third Comparative Embodiment

Figure 6:
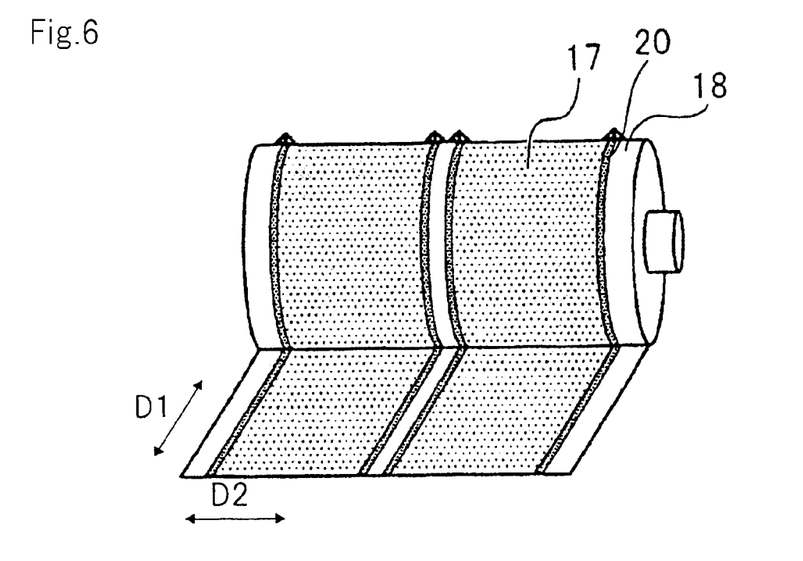
FIG. 6 is a perspective view showing an electrode roll for use in a lithium-ion secondary cell in the third comparative embodiment.

FIG. 6 is a perspective view of the electrode roll of a lithium-ion secondary cell in the third comparative embodiment. In the step of fabricating the positive electrode for use in the lithium-ion secondary cell in the third comparative embodiment and after carrying out the stripe application on a band-shaped current-collecting foil, insulation tape 20 was adhered to the boundary portion between forming section 17 and non-forming section 18. Although each insulation tape 20 was thin, as the current-collecting foil was coiled in roll form, the thickness of insulation tape 20 added up, and as a result, the portions in which insulation tape was adhered bulged out, as shown in FIG. 6. When the current-collecting foil was further coiled, breaks occurred in the current-collecting foil at the bulging portions. As a result, coiling the current-collecting foil to lengths of 1000 m or more was problematic in the third comparative embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Explanation of Reference Numbers

1 Nonaqueous electrolyte secondary cell-use electrode
2 electrode mixture layer
3 forming section
4 non-forming section
5 boundary
6 oxide film
7 positive electrode
8 negative electrode
9 separator
10 current-collecting foil
11 cell element
12 aluminum laminate sheathing
13 lithium-ion secondary cell

The invention claimed is:

1. A positive electrode for use in a nonaqueous electrolyte secondary cell comprising:
a current-collecting foil;
a positive electrode mixture layer, which contains a positive electrode active material, that is formed on a portion of said current-collecting foil, wherein the positive electrode active material comprises a lithium transition metal oxide; and
an oxide film that is provided in a region that extends from a portion of a forming section of said positive electrode mixture layer through a boundary between said forming section and a non-forming section of said positive electrode mixture layer and over said non-forming section on a surface of said current-collecting foil and under said positive electrode mixture layer,
wherein the oxide film does not extend over an entirety of the forming section and does not extend over an entirety of the non-forming section.

2. A method of fabricating the positive electrode for use in a nonaqueous electrolyte secondary cell according to claim 1, the method comprising:
a first step of applying, on said current-collecting foil that has greater length in a first direction than length in a second direction that is orthogonal to said first direction, said positive electrode mixture layer in a form of stripes that are parallel to said first direction and then providing an oxide film on said current-collecting foil in a region that extends from said portion of said forming section of said positive electrode mixture layer through said boundary between said forming section and said non-forming section of said positive electrode mixture layer and over said non-forming section on a surface of said current-collecting foil and under positive said electrode mixture layer;
a second step of, after said first step, coiling said current-collecting foil around an axis that is parallel to said second direction to form a positive electrode roll, and
a third step of cutting off the positive electrode to a desired size from said positive electrode roll.

3. The method of fabricating the positive electrode for use in a nonaqueous electrolyte secondary cell according to claim 2, wherein in said first step, said oxide film is formed by oxidizing a surface of said current-collecting foil.

4. A nonaqueous electrolyte secondary cell comprising a cell element realized by stacking the positive electrode for use in a nonaqueous electrolyte secondary cell according to claim 1 and a negative electrode with a separator interposed and a laminate sheathing that accommodates and seals said cell element; wherein:
said oxide film that is provided on said non-forming section of said positive electrode mixture layer at least partially overlaps with an end region of said separator when viewed from a stacking direction of said positive electrode and said negative electrode.

5. The nonaqueous electrolyte secondary cell according to claim 4, wherein said cell element is accommodated in said laminate sheathing in a coiled state in a form of a spiral.

* * * * *